United States Patent
Yagasaki et al.

(10) Patent No.: US 10,094,446 B2
(45) Date of Patent: Oct. 9, 2018

(54) METAL BELT FOR CONTINUOUSLY VARIABLE TRANSMISSION

(71) Applicant: HONDA MOTOR CO., LTD., Tokyo (JP)

(72) Inventors: Toru Yagasaki, Wako (JP); Soichiro Sumida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 14/895,598

(22) PCT Filed: Mar. 31, 2014

(86) PCT No.: PCT/JP2014/059481
§ 371 (c)(1),
(2) Date: Dec. 3, 2015

(87) PCT Pub. No.: WO2014/196254
PCT Pub. Date: Dec. 11, 2014

(65) Prior Publication Data
US 2016/0102732 A1    Apr. 14, 2016

(30) Foreign Application Priority Data
Jun. 4, 2013 (JP) .................................. 2013-117824

(51) Int. Cl.
*F16G 1/21* (2006.01)
*F16G 1/22* (2006.01)
*F16G 5/16* (2006.01)

(52) U.S. Cl.
CPC ...................................... *F16G 5/16* (2013.01)

(58) Field of Classification Search
CPC ... F16G 5/16; F16G 5/163; F16G 5/18; B21D 53/14; B21K 23/00
(Continued)

(56) References Cited

U.S. PATENT DOCUMENTS 4,900,296 A * 2/1990 Schmidt .................... F16G 5/18
474/242
5,374,223 A * 12/1994 Hendriks .................. F16G 5/16
474/242
(Continued)

FOREIGN PATENT DOCUMENTS

CN    1347481 A    5/2002
CN    101248289 A    8/2008
(Continued)

OTHER PUBLICATIONS

Office Action dated Sep. 6, 2017, issued in counterpart Japanese Application No. 2015-621327, with English translation (6 pages).
(Continued)

*Primary Examiner* — Henry Y Liu
(74) *Attorney, Agent, or Firm* — Westerman, Hattori, Daniels & Adrian, LLP

(57) ABSTRACT

In a metal belt for a continuously variable transmission having a saddle face of a metal element and a rocking edge positioned at substantially the same position in the radial direction, a rocking edge is provided at a radially outer end of a front face of a body part, the rocking edge being a fulcrum for pitching of the metal element of the metal belt which is wound around a drive pulley and a driven pulley and transmits a driving force between the two pulleys, and a recess is provided extending from a front face of a neck part to a front face of the body part. Thus, it is possible to minimize a space created between the front and rear metal elements and reduce the bending stress applied to the metal elements, thereby minimizing degradation of the power transmission efficiency.

2 Claims, 11 Drawing Sheets

FIRST EMBODIMENT

(58) Field of Classification Search
USPC .................................................. 474/242, 272
See application file for complete search history.

(56) References Cited

U.S. PATENT DOCUMENTS

| | | | | |
|---|---|---|---|---|
| 6,238,313 | B1 * | 5/2001 | Smeets | F16G 5/16 474/201 |
| 6,334,830 | B1 * | 1/2002 | Yagasaki | F16G 5/16 474/201 |
| 6,409,620 | B1 * | 6/2002 | Yoshida | F16G 5/16 474/201 |
| 6,464,606 | B2 * | 10/2002 | Brandsma | F16G 5/16 474/237 |
| 6,565,469 | B1 * | 5/2003 | Aoyama | F16G 5/16 474/240 |
| 6,578,249 | B2 * | 6/2003 | Fujioka | F16G 5/16 29/428 |
| 6,599,212 | B2 * | 7/2003 | Kanokogi | F16G 5/16 474/201 |
| 6,612,954 | B2 * | 9/2003 | Akagi | F16G 5/16 474/237 |
| 6,623,393 | B2 * | 9/2003 | Koyama | F16G 5/16 474/201 |
| 6,626,782 | B1 * | 9/2003 | Ohsono | B21D 53/14 474/201 |
| 6,843,743 | B2 * | 1/2005 | Aoyama | F16G 5/16 474/242 |
| 6,857,980 | B2 * | 2/2005 | van Liempd | F16G 5/16 474/242 |
| 6,896,633 | B2 * | 5/2005 | Kanehara | F16G 5/16 474/201 |
| 7,169,071 | B2 * | 1/2007 | Miura | F16G 5/16 474/242 |
| 7,846,049 | B2 * | 12/2010 | Kanehara | F16G 5/16 474/201 |
| 7,867,121 | B2 * | 1/2011 | Yagasaki | F16G 5/16 474/201 |
| 7,963,873 | B2 * | 6/2011 | Kobayashi | F16G 5/16 474/201 |
| 8,100,797 | B2 * | 1/2012 | Prinsen | B21D 53/14 474/201 |
| 8,672,787 | B2 * | 3/2014 | Faes | F16G 5/16 474/240 |
| 8,801,555 | B2 * | 8/2014 | Aoyama | F16G 5/16 474/242 |
| 2008/0305906 | A1 * | 12/2008 | Kobayashi | F16G 5/16 474/242 |

FOREIGN PATENT DOCUMENTS

| | | |
|---|---|---|
| JP | 60-58948 U | 4/1985 |
| JP | 63-281723 A | 11/1988 |
| JP | 2002-213539 A | 7/2002 |
| JP | 3695216 B2 | 9/2005 |
| JP | 2007-192254 A | 8/2007 |
| JP | 2008-116010 A | 5/2008 |
| JP | 2008-151266 A | 7/2008 |
| JP | 2008-303950 A | 12/2008 |
| JP | 2009-52665 A | 3/2009 |
| JP | 4424376 B2 | 3/2010 |
| WO | 2012/131841 A1 | 10/2012 |

OTHER PUBLICATIONS

Office Action dated Aug. 24, 2016, issued in counterpart Japanese Application No. 2015-521327. (4 pages).
Office Action dated Jun. 30, 2016, issued in Chinese Application No. 201480031608.9 (6 pages).
International Search Report dated Jul. 1, 2014, issued in counterpart International Application No. PCT/JP2014/059481 (2 pages).

* cited by examiner

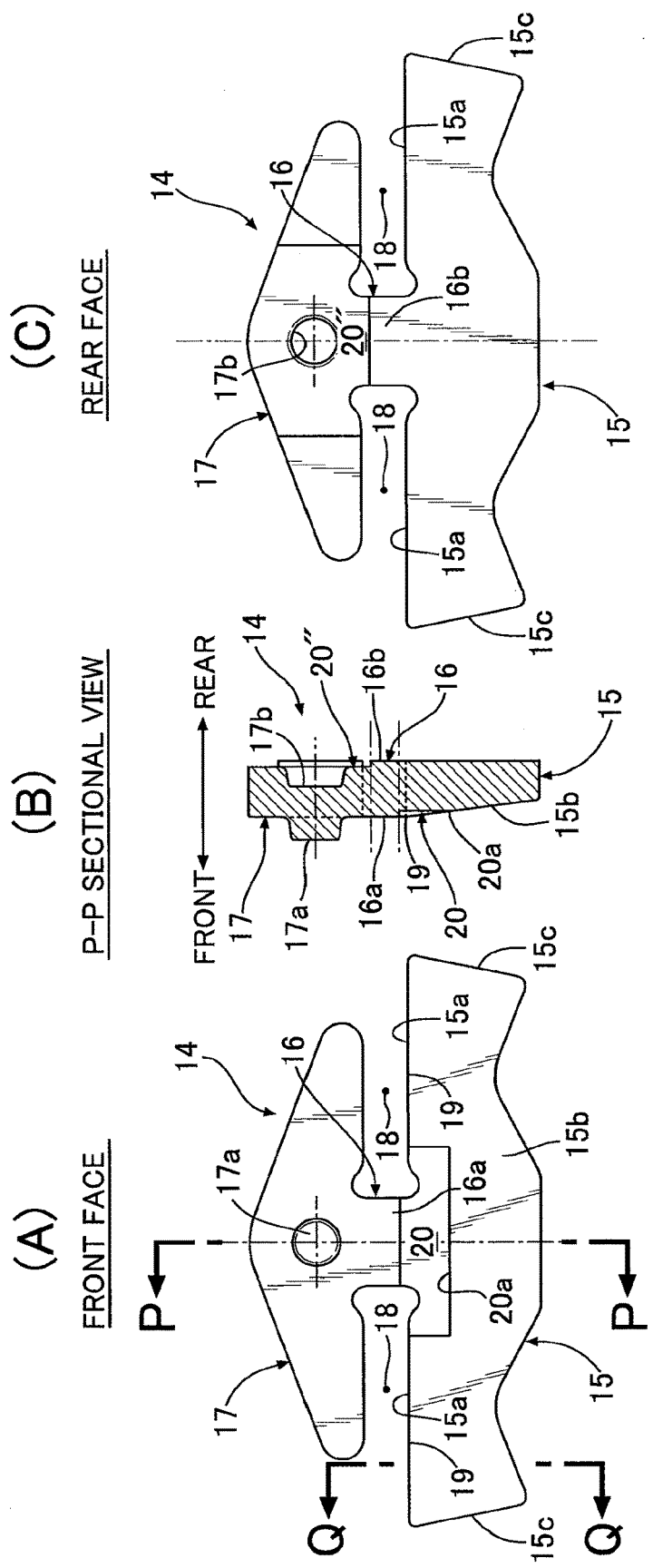

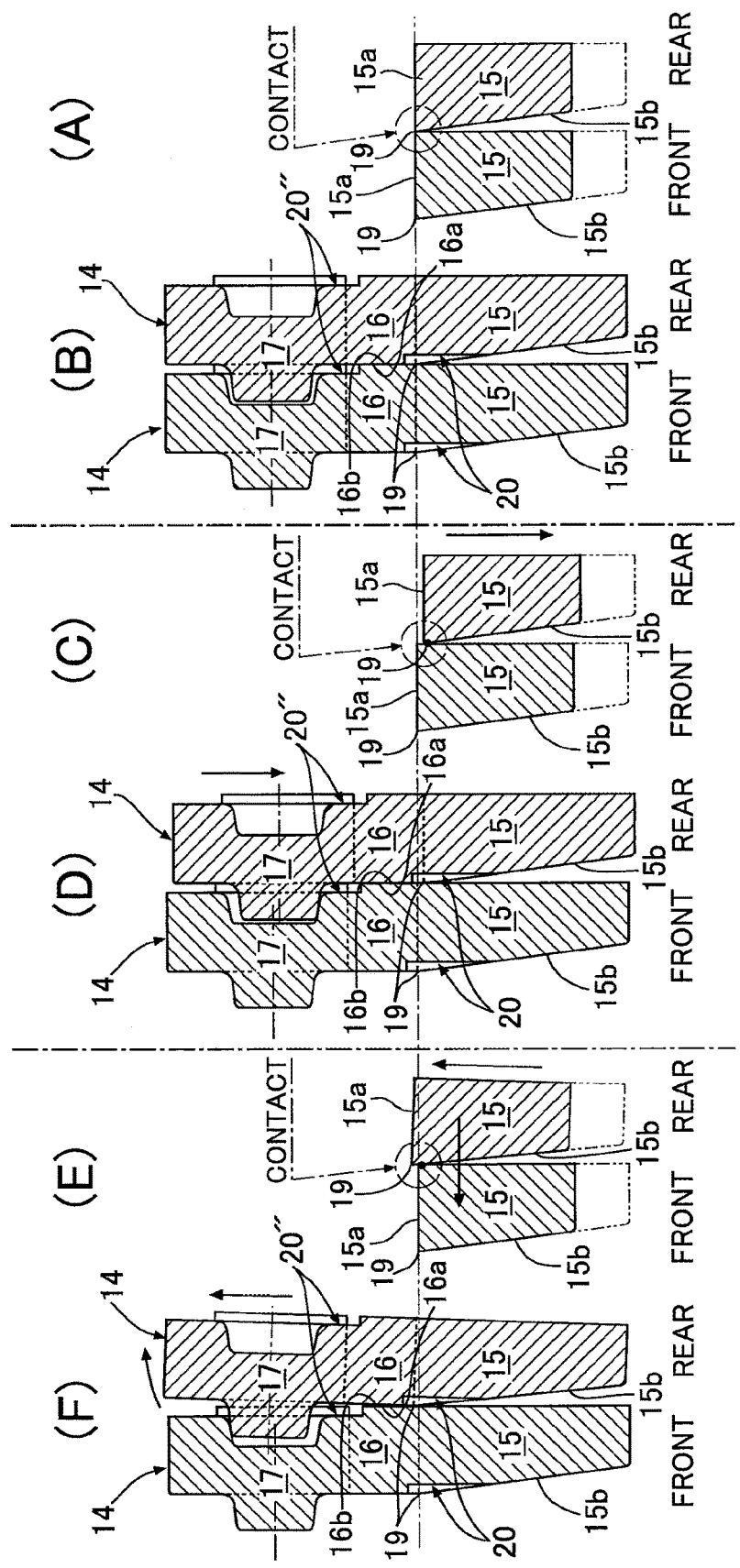
FIG.9 THIRD EMBODIMENT

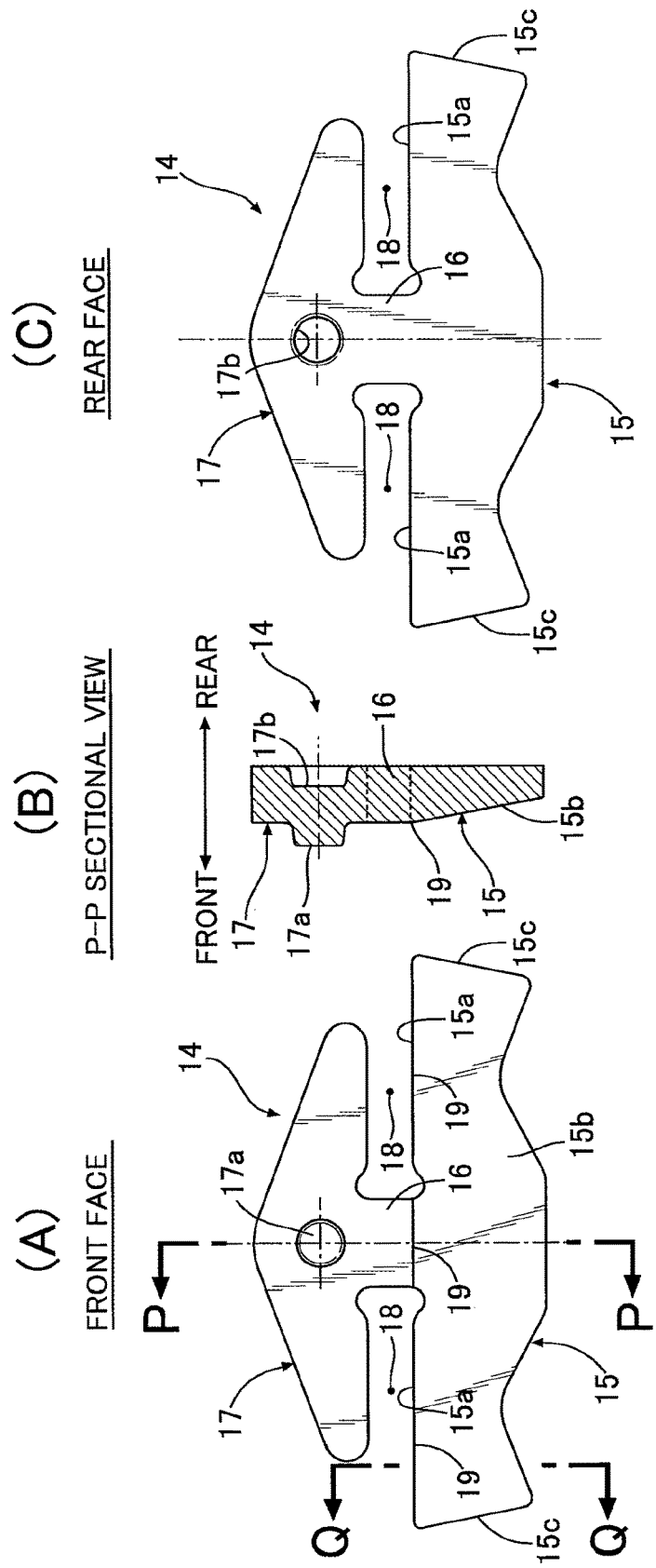

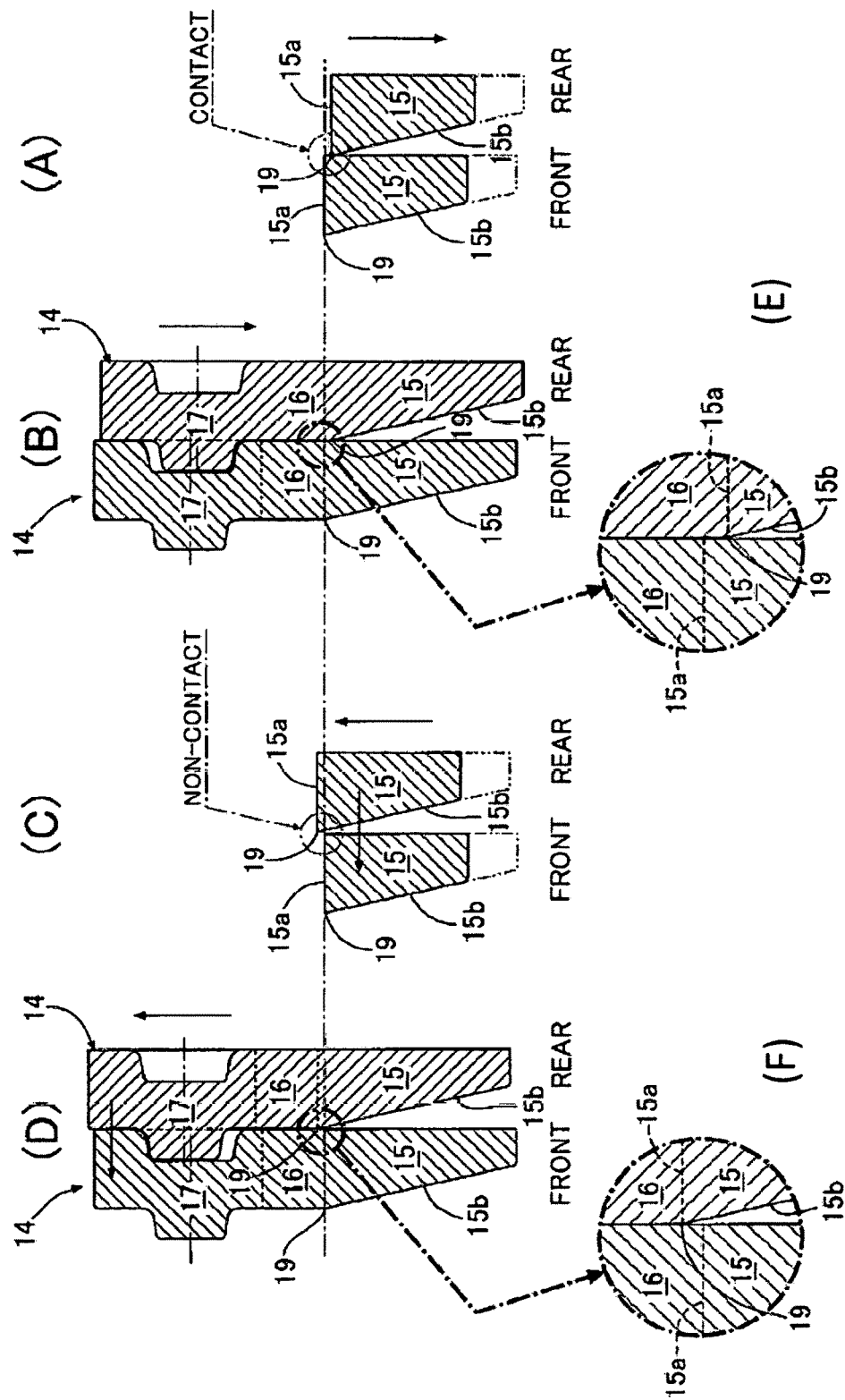

METAL BELT FOR CONTINUOUSLY VARIABLE TRANSMISSION

TECHNICAL FIELD

The present invention relates to a metal belt for a continuously variable transmission, the metal belt, which is wound around a drive pulley and a driven pulley and transmits a driving force between the two pulleys, including a pair of metal ring assemblies that are arranged side by side in a left-and-right direction and a large number of metal elements that are latched to the pair of metal ring assemblies in a state in which the metal elements are stacked in a fore-and-aft direction.

BACKGROUND ART

An arrangement in which a V-shaped block (metal element) is formed so as to have rocking edges in two steps at different levels in the height direction of the V-shaped block, and the lower step rocking edge among these rocking edges and a band-wound face (saddle face) within a band-assembly groove (ring slot) against which an inner peripheral face of an endless band (metal ring assembly) abuts are positioned at the same level in the height direction of the V-shaped block is known from Patent Document 1 below.

Due to this arrangement it becomes possible to prevent frictional loss by maintaining constant relative positions, in the direction of travel, on the band-wound face of adjacent V-shaped blocks between a pulley-wound region and a linear region of the endless band, and it also becomes possible, even when the pulley-winding diameter of the endless band changes from a large diameter to a medium diameter and to a small diameter, to accordingly change the relative inclined positions of adjacent V-shaped blocks owing to the rocking edges formed in two steps having different levels, thereby suppressing the amount of core displacement of the endless band between pulleys accompanying a change in speed.

Furthermore, a transmission belt (metal belt) in which a rocking edge, which is the center of rotation of adjacent elements that abut against each other, is formed at a position separated further toward the inner peripheral side than a saddle face of the element, at least one slit part housing a sub ring binding a plurality of elements arranged in an annular manner being formed further radially inside than the saddle face in the radial direction of the ring is known from Patent Document 2 below.

In accordance with this arrangement, since the elements can be bound not only by layered rings (metal ring assembly) layered on the saddle face but also by the sub ring inserted into the slit part, the total number of rings for binding the elements can be increased by at least one, and because of this the durability and the torque capacity of the transmission belt can be improved. Furthermore, since the sub ring inserted into the slit part is disposed at a position closer to the rocking edge than the other layered rings are, the friction between the sub ring and the slit part is small, and it is possible to prevent or suppress friction due to the number of rings being increased, any accompanying power loss, and degradation of the power transmission efficiency.

Moreover, an arrangement in which a rocking edge and a saddle face of an element are made to coincide, and when shaping the element by press forming such as punching out, the rocking edge is provided on a face on the side where a sharp edge can be formed is known from Patent Document 3 below.

In accordance with this arrangement, since the rocking edge of the element can be formed on the sharp edge, which is not influenced by 'rollover' when carrying out press forming, for example, it becomes possible to form the rocking edge and a face that the inner peripheral face of a ring abuts against when the ring is wound around the element at substantially the same position in the height direction of the element. As a result, relative slippage between the rocking edge and the inner peripheral face of the ring can be reduced, and frictional loss due to relative slippage can be decreased, thus improving the transmission efficiency of the transmission belt (metal belt).

RELATED ART DOCUMENTS

Patent Documents

Patent Document 1: Japanese Patent No. 3695216
Patent Document 2: International Patent Application Laid-open No. WO2012/131841
Patent Document 3: Japanese Patent No. 4424376

SUMMARY OF THE INVENTION

Problems to be Solved by the Invention

However, in the arrangement disclosed in Patent Document 1 above, since the endless band is disposed in a middle part of the V-shaped block, the height of a pulley abutment face of the V-shaped block that abuts against the V-face of the pulley becomes high, and not only is there the problem that the distance that the V-shaped block can move in the radial direction is restricted and the ratio range becomes small, but there is also the problem that since the rocking edges are formed with two steps, production of the V-shaped block becomes cumbersome, and the cost increases.

Furthermore, paragraph [0011] of Patent Document 1 above states that 'if the rocking edge were to be provided on a border part between a base part and a band-assembly groove of the V-shaped block, since the position of this border part would also correspond to a border part between a base part and a band-assembly groove of an adjoining V-shaped block, the rocking edge would drop into the band-assembly groove of an adjoining V-shaped block, the V-shaped blocks would be displaced relative to each other in the height direction, and this could not be a fundamental solution', but this suggests on the contrary that the problems could be solved if the structure were such that there would be no problem if the rocking edge dropped into the band-assembly groove of an adjoining V-shaped block.

Moreover, the arrangement disclosed in Patent Document 2 above has the problem that even if the sub ring inserted into the slit part is disposed at a position close to the rocking edge, since the other layered rings are disposed at positions further away from the rocking edge, it cannot prevent a frictional force from occurring between the saddle face and the layered rings.

Furthermore, in the arrangement disclosed in Patent Document 3 above, as described for the problem in Patent Document 1 above, there is a possibility that the rocking edge will drop into the band-assembly groove of an adjoining element, and the element will be displaced in the height direction. Moreover, since first elements and second elements that have different shapes are stacked in turn, there is the problem that management of the order of stacking thereof becomes troublesome, and the ease of assembly is degraded.

The present invention has been accomplished in light of the above circumstances, and it is an object thereof to provide a metal belt for a continuously variable transmission in which a saddle face and a rocking edge of a metal element are formed at substantially the same position in the radial direction, degradation of the efficiency of transmitting the driving force being minimized by enabling displacement of the metal element in the radial direction and in the rotational direction to be allowed.

Means for Solving the Problems

In order to attain the above object, according to a first aspect of the present invention, there is provided a metal belt for a continuously variable transmission, the metal belt, which is wound around a drive pulley and a driven pulley and transmits a driving force between the two pulleys, comprising a pair of metal ring assemblies that are arranged side by side in a left-and-right direction and a large number of metal elements that are latched to the pair of metal ring assemblies in a state in which the metal elements are stacked in a fore-and-aft direction, the metal element comprising a pair of ring slots with which the pair of metal ring assemblies engage, a neck part that is positioned between the pair of ring slots, a body part on which is formed a saddle face that is continuous with a radially inner side of the neck part and supports an inner peripheral face of the pair of metal ring assemblies, and an ear part that is continuous with a radially outer side of the neck part and opposes an outer peripheral face of the pair of metal ring assemblies, and a rocking edge being provided at a radially outer end of a front face of the body part, the rocking edge being a fulcrum for pitching of the metal element, wherein a first recess extending from the neck part to the body part is formed in front faces of the neck part and the body part.

Further, according to a second aspect of the present invention, in addition to the first aspect, a second recess extending from the neck part to the body part is formed in rear faces of the neck part and the body part.

Furthermore, according to a third aspect of the present invention, in addition to the first aspect, the first recess is formed so as to extend from one part of the neck part to the body part, a third recess extending from one part of the neck part to the ear part is formed in rear faces of the neck part and the body part, and the first recess and the third recess are positioned so as not to overlap one another when viewed in the fore-and-aft direction.

Effects of the Invention

In accordance with the first aspect of the present invention, the metal element of the metal belt, which is wound around the drive pulley and the driven pulley and transmits a driving force between the two pulleys, includes the pair of ring slots, the neck part, the body part, and the ear part. Since the rocking edge, which becomes a fulcrum for the metal element to undergo pitching, is provided on the radially outer end (the front end of the saddle face) of the front face of the body part, even when the metal element undergoes pitching, it is possible to prevent slippage from occurring between the saddle face of the body part of the metal element and the inner peripheral face of the metal ring assembly, and the power transmission efficiency of the metal belt can be enhanced.

Since the first recess extending from the neck part to the body part is formed in the front faces of the neck part and the body part, when the metal element on the rear side is displaced toward the radially outer side with respect to the metal element on the front side, the rocking edge of the metal element on the rear side enters the ring slot of the metal element on the front side, and the metal element on the rear side moves so as to be closer to the metal element on the front side, thereby enabling the inclined face of the body part of the metal element on the rear side to abut against the body part of the metal element on the front side via the entire length in the left-and-right direction. As a result, the bending load applied to the portion where the neck part is connected to the body part decreases, and bending of the neck part is suppressed, thus minimizing degradation of the power transmission efficiency.

When the metal elements on the front side and the rear side rotate relative to each other around the axis in the fore-and-aft direction, since a space is created between the rear face (the rear end of the saddle face) of the body part of the metal element on the front side and the front face (inclined face) of the body part of the metal element on the rear side, the body part undergoes bending deformation so as to close the space by means of the pushing force between the metal elements, thus causing degradation of the strength and degradation of the power transmission efficiency. However, since the first recess of the metal element extends from the neck part to the body part, the starting point of the space moves due to the first recess and the length in the left-and-right direction of the space is extended, thereby reducing the bending stress (or the amount of relative deformation) of the body part required in order to close the space and minimizing degradation of the strength and degradation of the power transmission efficiency.

Furthermore, in accordance with the second aspect of the present invention, since the second recess extending from the neck part to the body part is formed in the rear faces of the neck part and the body part, due to the second recess functioning in the same manner as the first recess, even if the front and rear metal elements are displaced in the radial direction or in the rotational direction, it is possible to minimize degradation of the power transmission efficiency.

Moreover, in accordance with the third aspect of the present invention, since the first recess is formed so as to extend from one part of the neck part to the body part, the third recess extending from one part of the neck part to the ear part is formed in the rear faces of the neck part and the body part, and the first recess and the third recess are positioned so as not to overlap one another when viewed in the fore-and-aft direction, due to the first recess, even if the metal element on the front side and the metal element on the rear side are displaced in the radial direction or in the rotational direction, not only is it possible to minimize degradation of the power transmission efficiency, but it is also possible to efficiently transmit the driving force by stabilizing the attitude of the metal element by making the rear face of the neck part of the metal element on the front side (portion where the third recess is not formed) abut against the front face of the neck part of the metal element on the rear side (portion where the first recess is not formed).

BRIEF DESCRIPTION OF DRAWINGS

FIGS. 8(A)-8(C) are diagrams showing the shape of a metal element. (third embodiment)

FIGS. 9(A)-9(F) are diagrams for explaining the operation when there is displacement of the metal element in the radial direction. (third embodiment)

FIGS. 10(A)-10(C) are diagrams showing the shape of a metal element. (Comparative Example)

FIGS. 11(A)-11(F) are diagrams for explaining the operation when there is displacement of the metal element in the radial direction. (Comparative Example)

EXPLANATION OF REFERENCE NUMERALS AND SYMBOLS

Figure 1:
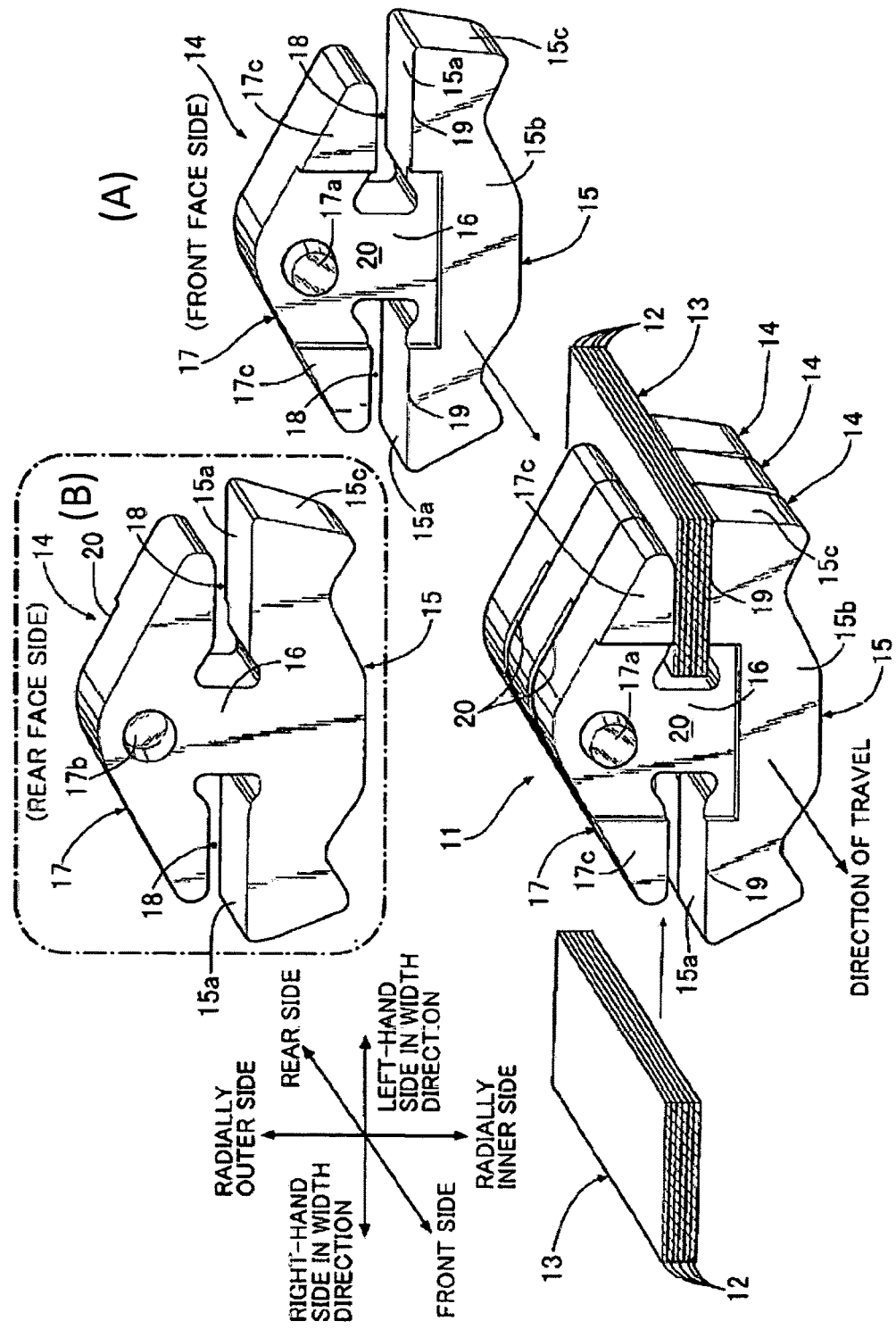
FIGS. 1(A) and 1(B) are a perspective views showing part of a metal belt for a continuously variable transmission. (first embodiment)
Figure 2:
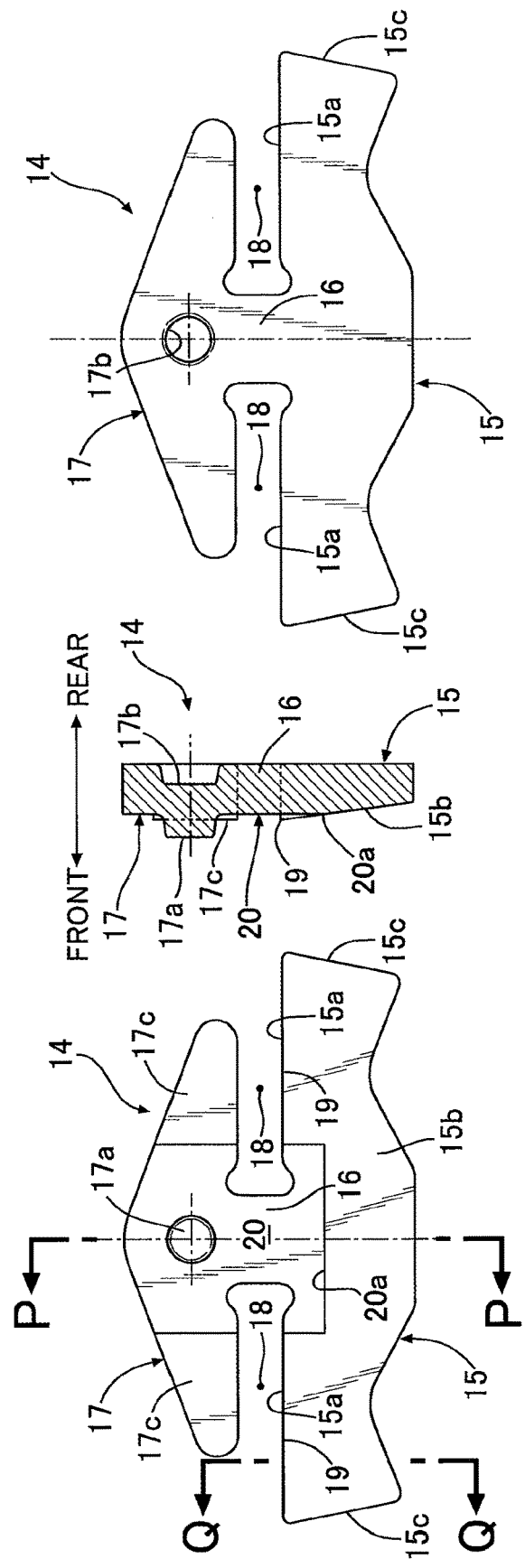
FIGS. 2(A)-2(C) are diagrams showing the shape of a metal element. (first embodiment)

11 Metal belt
13 Metal ring assembly
14 Metal element
15 Body part
15a Saddle face
15b Inclined face
16 Neck part
17 Ear part
18 Ring slot
19 Rocking edge
20 First recess
20' Second recess
20" Third recess

MODES FOR CARRYING OUT THE INVENTION

Embodiments of the present invention are explained by reference to the attached drawings.

First Embodiment

First, referring to FIG. 1 to FIG. 4 a first embodiment of the present invention is explained.

As shown in FIG. 1(A) and (B), a metal belt 11 that is wound around a drive pulley and a driven pulley of a belt type continuously variable transmission and transmits a driving force is formed from a pair of metal ring assemblies 13 and 13 formed by layering a plurality of metal rings 12, and a large number of metal elements 14 supported on the pair of metal ring assemblies 13 and 13.

In the present specification, the fore-and-aft direction is defined with the direction of travel of the metal belt 11 as forward and the direction opposite thereto as rearward. Furthermore, the radial direction is defined as a direction perpendicular to the fore-and-aft direction with the outer peripheral side of a pulley that the metal belt 11 is wound around as the outer side and with the center side as the inner side. Moreover, the left-and-right direction is defined as a direction that is perpendicular to the fore-and-aft direction and the radial direction and in which the pair of metal ring assemblies 13 and 13 are arranged side by side.

As shown in FIG. 1(A) and (B) and FIG. 2(A)-(C), the metal element 14 is formed by punching out a metal plate by press forming, and includes a substantially trapezoidal body part 15 on the radially inner side, a neck part 16 extending from the middle in the left-and-right direction of the body part 15 toward the radially outer side, and a triangular ear part 17 connected to the radially outer side of the neck part 16 and extending toward opposite sides in the left-and-right direction. A pair of ring slots 18 and 18 are formed at positions sandwiched by the outer edge in the radial direction of the body part 15, the outer edge in the left-and-right direction of the neck part 16, and the inner edge in the radial direction of the ear part 17, the ring slots 18 and 18 opening to the outside in the left-and-right direction and housing the pair of metal ring assemblies 13 and 13.

Saddle faces 15a and 15a are formed on radially outer faces of the body part 15 that face the ring slots 18 and 18, inner peripheral faces of the metal ring assemblies 13 and 13 abutting against the saddle faces 15a and 15a. An inclined face 15b is formed on a front face of the body part 15, the inclined face 15b tapering so as to decrease in thickness in going from the radially outer side toward the radially inner side, and a rocking edge 19 extending linearly in the left-and-right direction is formed at a position where the radially outer end of the inclined face 15b intersects the front end of the saddle faces 15a and 15a. A pair of pulley abutment faces 15c and 15c are formed at opposite ends in the left-and-right direction of the body part 15, the pulley abutment faces 15c and 15c being capable of abutting against a V-face of a pulley.

A first recess 20 is formed in a front face of the metal element 14, the first recess 20 extending over the entire region of the neck part 16, a middle part in the left-and-right direction of the ear part 17, and a middle part in the left-and-right direction of the body part 15. The first recess 20 is formed by hollowing out part of a front face of the metal element 14, which is basically a flat face, at a constant depth, the corners thereof being a step rising sharply at right angles. However, since the front face of the body part 15 is the inclined face 15b, a radially inner edge 20a of the first recess 20 is smoothly continuous with the inclined face 15b on the radially inner side of the rocking edge 19.

A truncated conical nose 17a projecting forward is formed on a front face of the middle of the ear part 17, and a hole 17b is formed in a rear face of the middle of the ear part 17, the hole 17b opening rearward and the nose 17a being capable of fitting thereinto. The nose 17a and the hole 17b fit together with a slight gap therebetween, and this therefore allows adjacent front and rear metal elements 14 and 14 to move in parallel to each other in a range corresponding to the gap and to rotate relative to each other around the axis in the fore-and-aft direction. A pair of flat portions 17c and 17c are formed on opposite end parts in the left-and-right direction of the ear part 17 so as to sandwich the first recess 20. The height of the flat portions 17c and 17c is flush with the height of the rear face of the body part 15.

The operation of the first embodiment of the present invention having the above arrangement is now explained.

The metal belt 11 wound around the drive pulley and the driven pulley transmits a driving force by the pushing force of a chord section extending linearly from the drive pulley toward the driven pulley. In the chord section, the metal elements 14 are aligned in parallel to each other, whereas in a wound section where the metal belt 11 is wound around the pulley, since the metal elements 14 change their attitude in a radial manner with the center on the axis of the pulley, they swing relative to each other so that the gap between the outer ends in the radial direction of the adjacent metal elements 14 increases and the gap between the inner ends in the radial direction decreases. In this process, the rocking edge 19 of the metal element 14 on the rear side abutting against the rear face of the metal element 14 on the front side becomes a fulcrum, and the front and rear metal elements 14 and 14 undergo pitching (swinging in the fore-and-aft direction) relative to each other in a range corresponding to the gap between the nose 17a and the hole 17b, thus allowing the attitude to change.

Furthermore, since the metal element 14 of the present embodiment has the rocking edge 19 formed at the front ends of the saddle faces 15a and 15a, and the height in the radial direction of the rocking edge 19 coincides with the height in the radial direction of the saddle faces 15a and 15a, when the metal elements 14 undergo pitching in the wound section, the saddle faces 15a and 15a of adjacent metal elements 14 and 14 are prevented from being separated in the fore-and-aft direction, and degradation of the power transmission efficiency due to slippage occurring between the saddle faces 15a and 15a and the inner peripheral faces of the metal ring assemblies 13 and 13 can be avoided. If the rocking edge 19 were to be provided further radially inward than the saddle faces 15a and 15a, when the metal elements 14 underwent pitching in the wound section, the saddle faces 15a and 15a of adjacent metal elements 14 and 14 would be separated in the fore-and-aft direction, and there would therefore not only be the occurrence of slippage between the saddle faces 15a and 15a and the inner peripheral faces of the metal ring assemblies 13 and 13, but also the power transmission efficiency would deteriorate due to the metal ring assemblies 13 and 13 being stretched.

With regard to adjacent metal elements 14 and 14, the nose 17a of the metal element 14 on the rear side is fitted into the hole 17b of the metal element 14 on the front side, and their positions are restricted by the tension of the metal ring assemblies 13 and 13 pushing the saddle faces 15a and 15a toward the radially inner side, but since there is a gap between the nose 17a and the hole 17b, radial displacement of the metal elements 14 in the chord section cannot be avoided.

FIG. 10 (A)-(C) shows the shape of a metal element 14 of a Comparative Example, which does not have a first recess 20 in a front face. FIG. 11 (A)-(F) shows the operation when the metal element 14 of the Comparative Example is displaced in the radial direction. FIGS. 11 (A), (B) and (E), which correspond to a sectional view along line P-P and a sectional view along line Q-Q in FIG. 10 (A) respectively, show states in which the metal element 14 on the rear side is displaced toward the radially inner side with respect to the metal element 14 on the front side; in this case the entire length of the rocking edge 19 of the metal element 14 on the rear side abuts against the rear face of the body part 15 of the metal element 14 on the front side, and transmission of the driving force is carried out efficiently.

However, as shown in FIGS. 11 (C), (D) and (F), which correspond to the sectional view along line P-P and the sectional view along line Q-Q in FIG. 10 (A) respectively, when the metal element 14 on the rear side is displaced toward the radially outer side with respect to the metal element 14 on the front side, a middle part in the left-and-right direction of the rocking edge 19 of the metal element 14 on the rear side can abut against the rear face of the neck part 16 of the metal element 14 on the front side, opposite end parts in the left-and-right direction of the rocking edge 19 of the metal element 14 on the rear side oppose the ring slots 18 and 18 of the metal element 14 on the front side, and a gap occurs between the rocking edge 19 and the rear face of the metal element 14 on the front side. As a result, only part (the middle part in the left-and-right direction) of the rocking edge 19 transmits the driving force, a bending load occurs in a portion where the neck part 16 is connected to the body part 15, and there are the problems that the strength is degraded and the transmission of driving force cannot be carried out efficiently.

Figure 3:
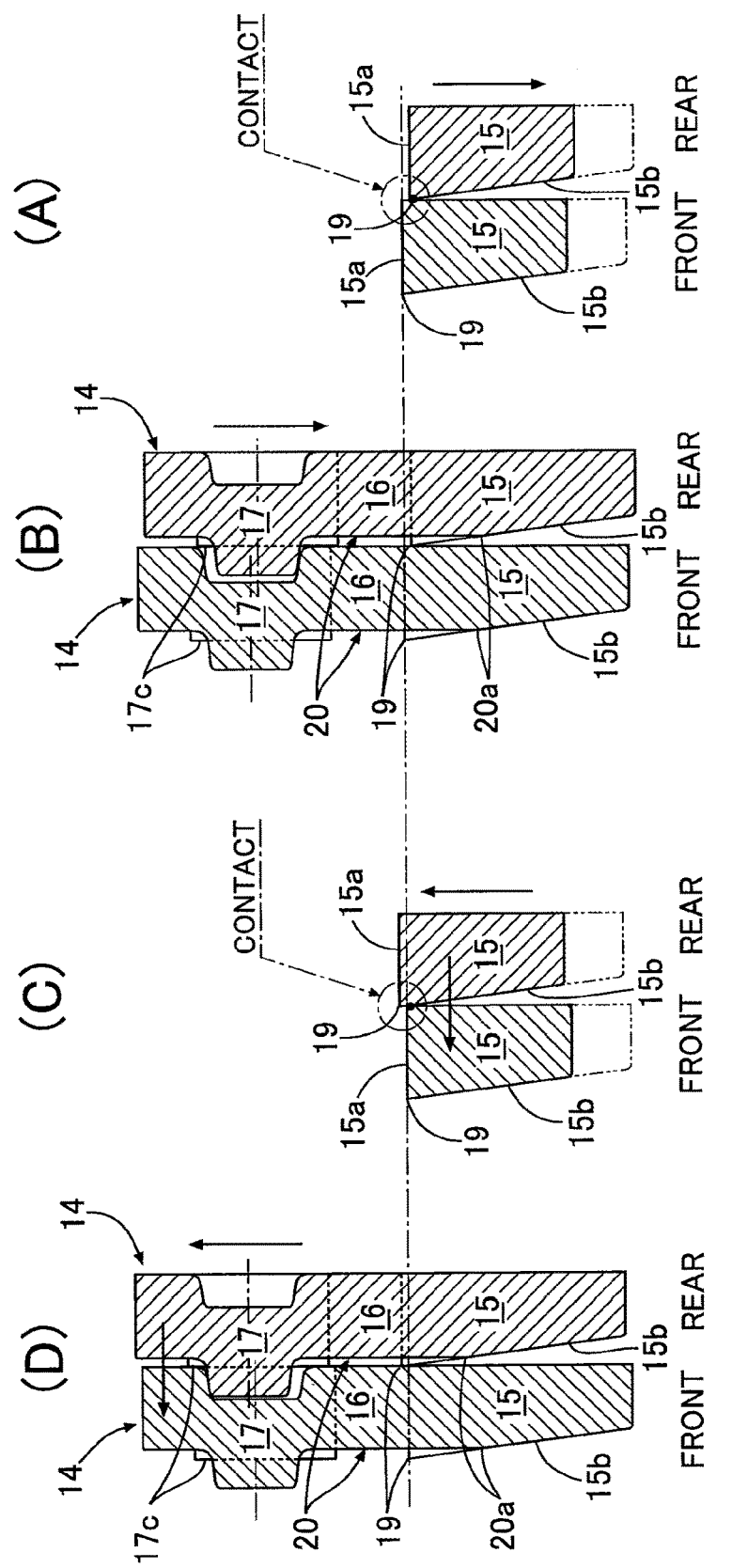
FIGS. 3(A)-3(D) are diagrams for explaining the operation when there is displacement of the metal element in the radial direction. (first embodiment)

FIG. 3 (A)-(D) shows the operation when the metal element 14 of the present embodiment is displaced in the radial direction. FIGS. 3 (A) and (B) show a state in which the metal element 14 on the rear side is displaced toward the radially inner side with respect to the metal element 14 on the front side, and in this case, although the first recess 20 does not function, since the entire length of the rocking edge 19 of the metal element 14 on the rear side abuts against the rear face of the body part 15 of the metal element 14 on the front side in the same manner as in the Comparative Example of FIGS. 11 (A), (B) and (E), bending of the neck part 16 does not occur, and the efficiency of transmitting the driving force does not deteriorate.

On the other hand, as shown in FIGS. 3 (C) and (D), when the metal element 14 on the rear side is displaced toward the radially outer side with respect to the metal element 14 on the front side, since the rocking edge 19 at the lower end of the neck part 16 on the front face of the metal element 14 on the rear side disappears due to the first recess 20 formed therein, while the inclined face 15b of the body part 15 of the metal element 14 on the rear side is in sliding contact with the rear ends of the saddle faces 15a and 15a of the metal element 14 on the front side, the metal element 14 on the rear side can move forward so as to be closer to the metal element 14 on the front side while moving toward the radially outer side.

In this way, due to the metal element 14 on the rear side moving forward so as to be closer to the metal element 14 on the front side while moving toward the radially outer side, abutment between the inclined faces 15b and 15b of the metal element 14 on the rear side and the rear ends of the saddle faces 15a and 15a of the metal element 14 on the front side is maintained, it therefore becomes possible to transmit the driving force via the entire length in the left-and-right direction of the inclined faces 15b and 15b, the bending load applied to a portion where the neck part 16 is connected to the body part 15 decreases, and bending of the neck part 16 is suppressed, thus minimizing degradation of the strength and degradation of the efficiency of transmitting the driving force.

Furthermore, since the flat portions 17c and 17c at opposite ends in the left-and-right direction of the front face of the ear part 17 sandwiching the first recess 20 are aligned at the same height as that of the rocking edge 19, when the metal elements 14 are in the chord section between the drive pulley and the driven pulley, not only do the metal element 14 on the front side and the metal element 14 on the rear side abut against each other via the rocking edge 19, but the metal element 14 on the rear side abuts against the rear face of the metal element 14 on the front side also via the flat portions 17c and 17c of the ear part 17. As a result, the metal elements 14 that are in the chord section and are not displaced in the radial direction abut against each other via both the pair of flat portions 17c and 17c of the ear part 17 and the rocking edge 19, and it is thus possible for them to maintain a stable attitude by being aligned in parallel to each other without undergoing pitching.

In addition, as shown in FIGS. 3 (C) and (D), when the metal element 14 on the rear side is displaced toward the radially outer side with respect to the metal element 14 on the front side and moves forward so that the rocking edge 19 of the metal element 14 on the rear side enters the ring slots 18 and 18 of the metal element 14 on the front side, since the flat portions 17c and 17c of the ear part 17 of the metal element 14 on the rear side cannot move forward because of interference with the rear face of the ear part 17 of the metal element 14 on the front side, the radially outer end of the metal element 14 on the rear side attempts to fall rearward. However, since the flat portions 17c and 17c of the ear part 17 can easily elastically deform rearward via a part where they are connected to the first recess 20, accompanying forward movement of the rocking edge 19 of the metal element 14 on the rear side, the flat portions 17c and 17c of the ear part 17 of the metal element 14 on the rear side undergo rearward elastic deformation, and adjacent front and rear metal elements 14 and 14 can maintain a mutually parallel positional relationship.

Figure 4:
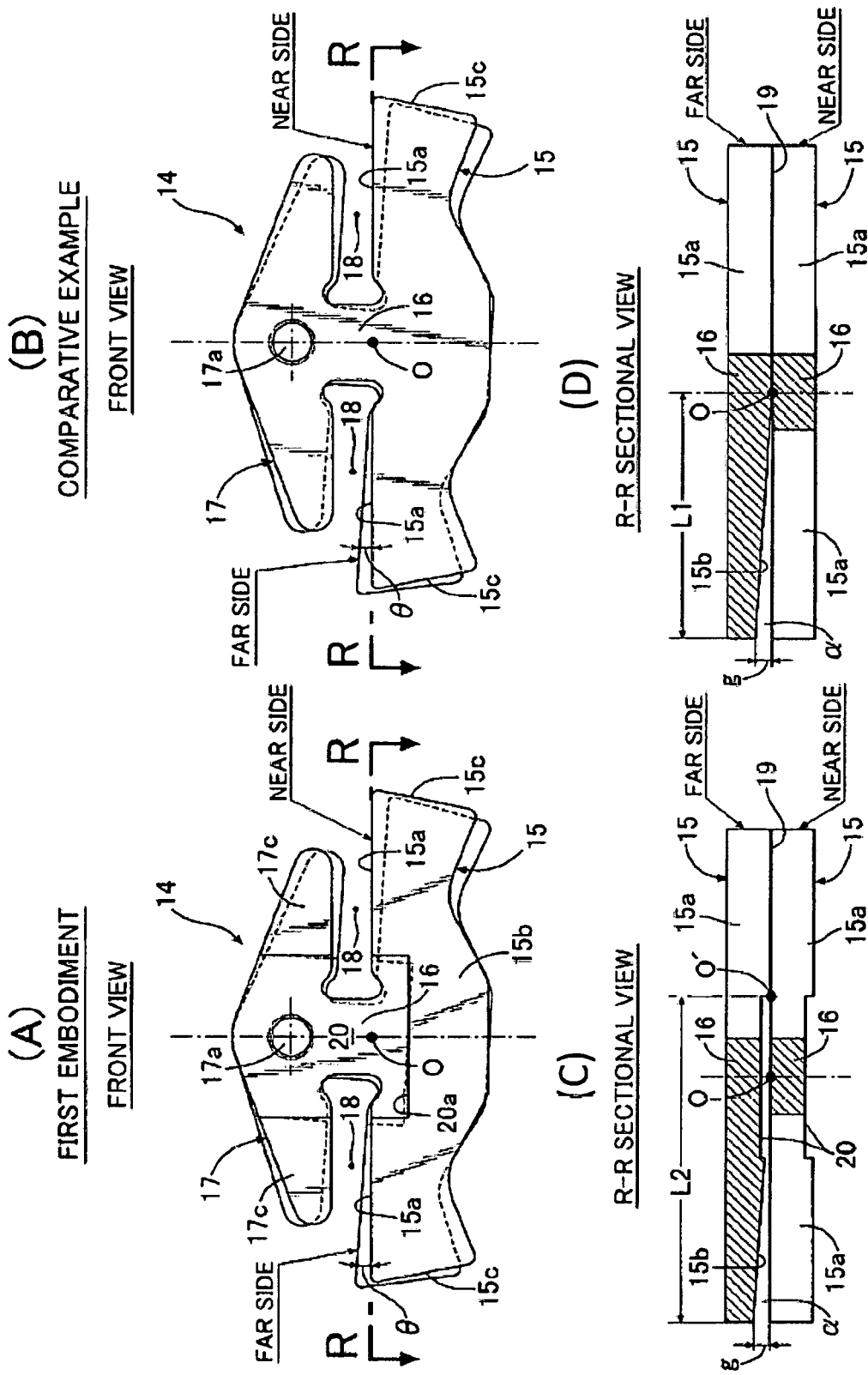
FIGS. 4(A)-4(D) are diagrams for explaining the operation when there is displacement of the metal element in the rotational direction. (first embodiment)

FIG. 4 (B) and (D) corresponds to a metal element 14 of a Comparative Example, which does not have a first recess 20, and shows the state when two adjacent metal elements 14 and 14 are viewed from the front face side; the metal element 14 on the far side is rotated only by an angle θ in the clockwise direction around a center of rotation O with respect to the metal element 14 on the near side. The reason that the pair of metal elements 14 and 14 rotate relative to each other around the center of rotation O is because each metal element 14 is restricted by two metal ring assemblies 13 and 13, and an intermediate position between left and right saddle faces 15a and 15a that the two metal ring assemblies 13 and 13 abut against becomes the center of rotation O. Adjacent metal elements 14 and 14 engage with each other via a nose 17a and a hole 17b formed on the ear parts 17 and 17, but since there is predetermined play between the nose 17a and the hole 17b, relative rotation of the pair of metal elements 14 and 14 around the center of rotation O is allowed.

The lower part of FIG. 4 (B) and (D) shows a sectional view that is sectioned by a sectional line along the rocking edge 19 of the metal element 14 on the near side, and with regard to the metal element 14 on the near side, a neck part 16, which is sectioned by the sectional line, appears between the left and right saddle faces 15a and 15a. On the other hand, with regard to the metal element 14 on the far side, the body part 15 on the right-hand side in the figure is not sectioned, and the saddle face 15a on the right-hand side in the figure is thus shown, but the neck part 16 and the body part 15 on the left-hand side in the figure are sectioned by the sectional line. Since an inclined face 15b, which is inclined from the saddle face 15a toward the radially inner side, is formed on a front face of the body part 15, and the thickness in the fore-and-aft direction of the body part 15 gradually reduces in going toward the radially inner side, the thickness of the body part 15 sectioned by the sectional line reduces further in going to the left-hand side in the figure, and due to a gap g being created between the left end of the body part 15 of the metal element 14 on the near side and the left end of the body part 15 of the metal element 14 on the far side, a triangular space α with the center of rotation O as a starting point is formed between the rear face of the body part 15 of the metal element 14 on the near side and the front face (inclined face 15b) of the body part 15 of the metal element 14 on the far side.

In this way, if the two adjacent metal elements 14 and 14 rotate relative to each other around the center of rotation O, the space α is created between the rear face of the body part 15 of the metal element 14 on the near side and the front face (inclined face 15b) of the body part 15 of the metal element 14 on the far side, the metal element 14 undergoes bending deformation so as to close the space α by means of the pushing force acting between the metal elements 14, and there is therefore a possibility that degradation of the strength and degradation of the power transmission efficiency will occur.

On the other hand, FIG. 4 (A) and (C) corresponds to the metal element 14 of the present embodiment, which has the first recess 20. In the Comparative Example, the starting point of the triangular space α coincides with the center of rotation O of the middle in the left-and-right direction of the metal element 14, but in the present embodiment since the first recess 20 is formed in the front face of the metal element 14 on the far side, the starting point of a triangular space α is at a point O', which is displaced toward the right end of the first recess 20. As a result, in the Comparative Example the distance from the point O, which is the starting point of the space α, to the end point of the space α is L1, whereas in the present embodiment the distance from the point O', which is the starting point of the space α, to the end point of the space α is L2 (>L1).

Therefore, when the metal element 14 undergoes bending deformation so as to close the space α by means of the pushing force acting between the metal elements 14, since in the Comparative Example it is necessary to absorb the bending corresponding to the gap g in a range of distance L1, whereas in the embodiment it is only necessary to absorb the bending corresponding to the gap g of the same degree in a range L2, which is longer than L1, it is possible to reduce the bending stress (or amount of relative deformation) of the body part 15 connected to the neck part 16 of the metal element 14, thus minimizing degradation of the strength and degradation of the power transmission efficiency.

Second Embodiment

Figure 6:
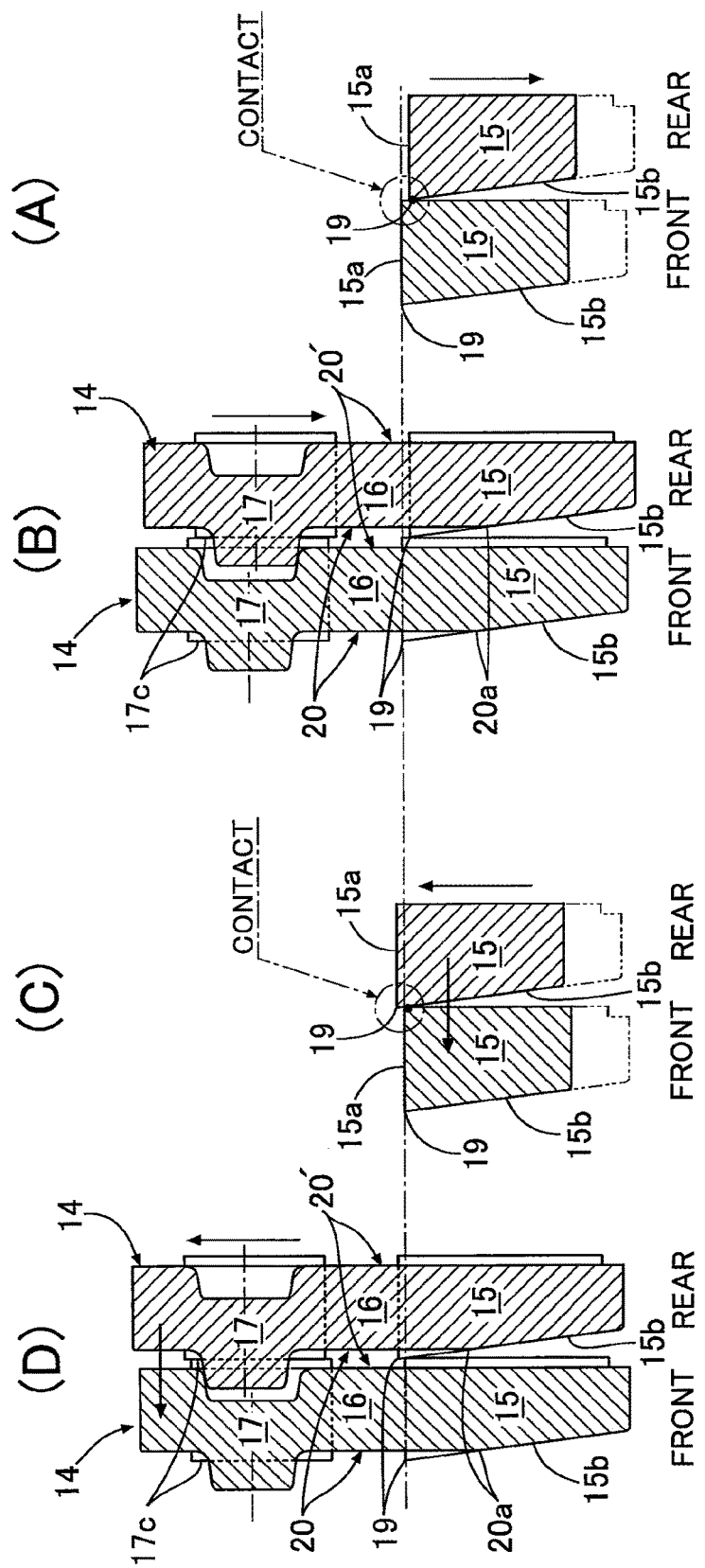
FIGS. 6(A)-6(D) are diagrams for explaining the operation when there is displacement of the metal element in the radial direction. (second embodiment)
Figure 7:
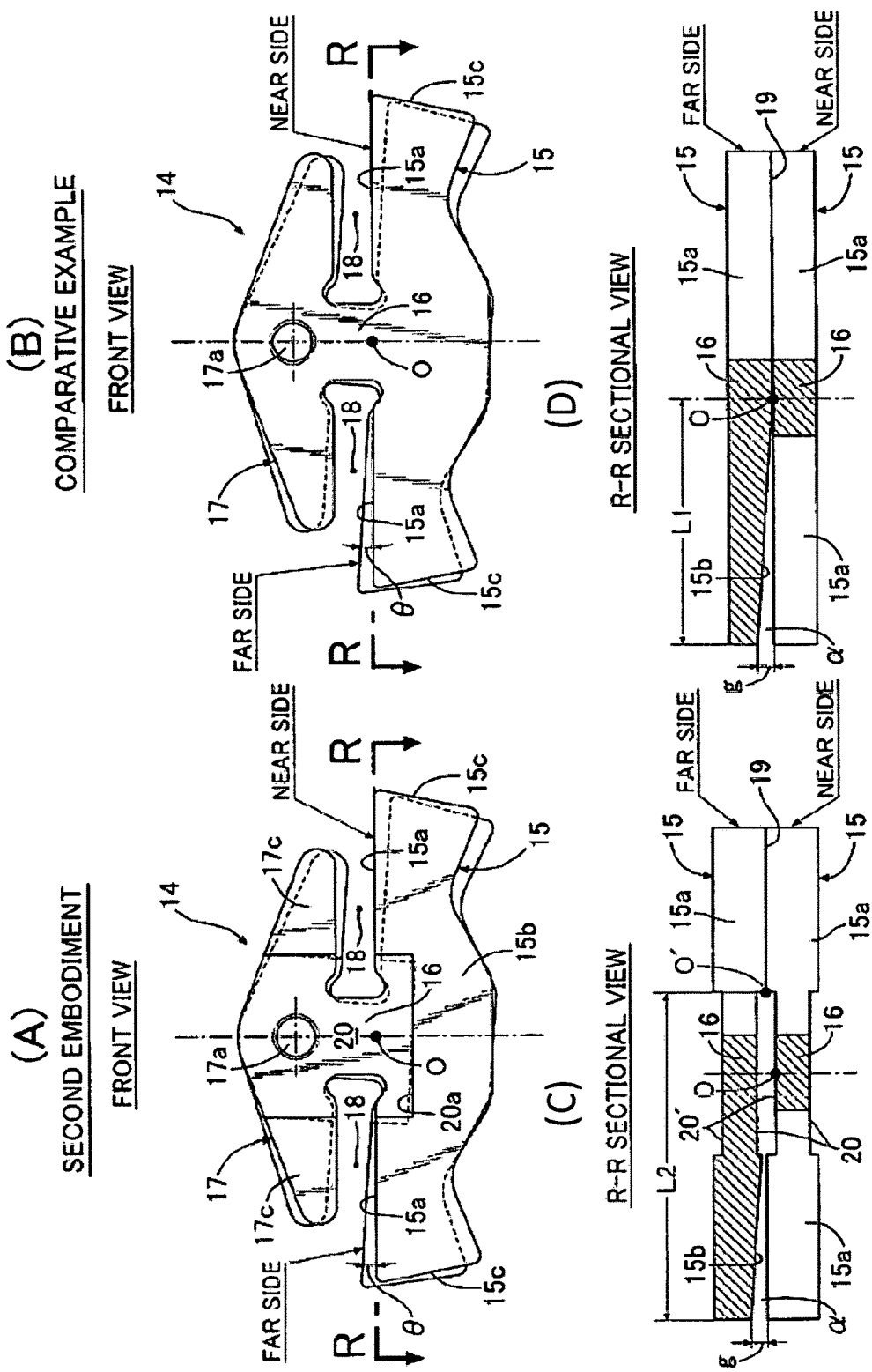
FIGS. 7(A)-7(D) are diagrams for explaining the operation when there is displacement of the metal element in the rotational direction. (second embodiment)

A second embodiment of the present invention is now explained by reference to FIG. 5 to FIG. 7.

Figure 5:
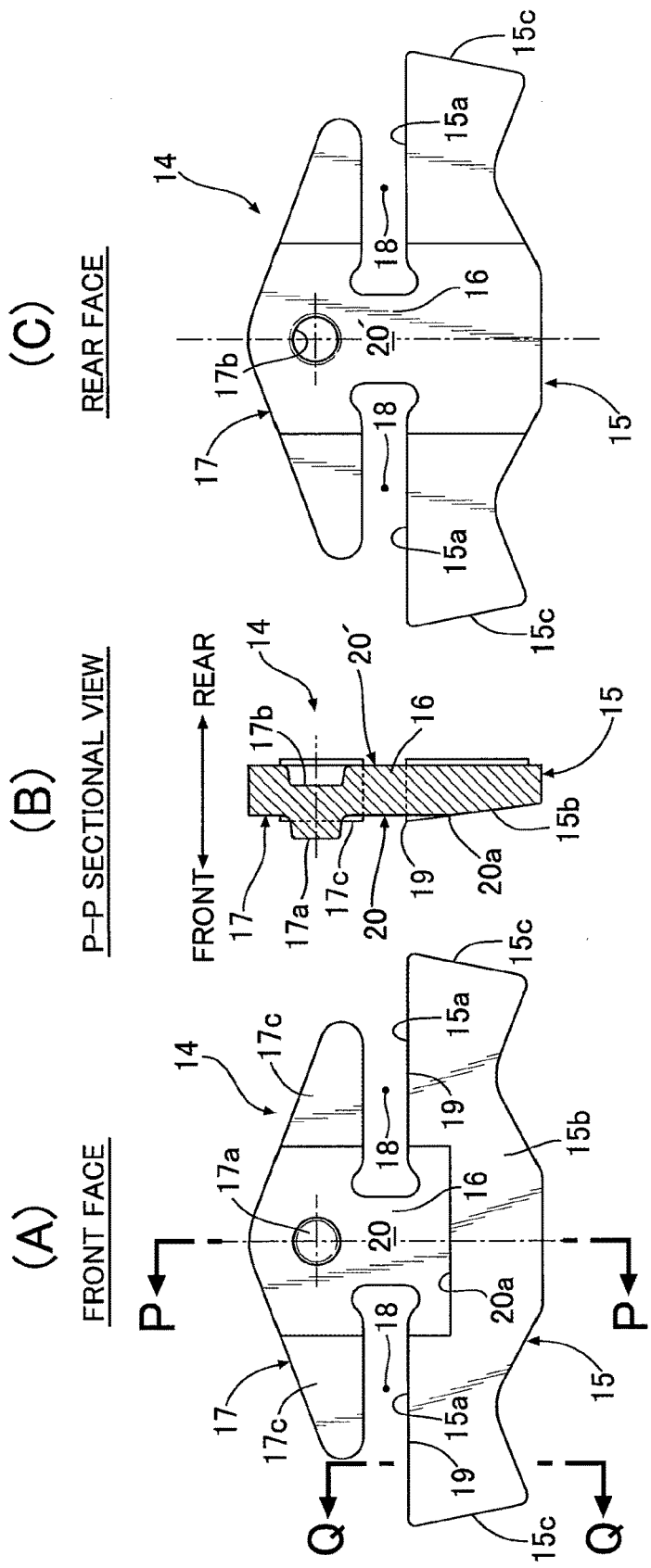
FIGS. 5(A)-5(C) are diagrams showing the shape of a metal element. (second embodiment)

In the first embodiment, the first recess 20 is formed on the front face side of the metal element 14, but as shown in FIG. 5 (A)-(C) in the second embodiment, in addition to a first recess 20, a second recess 20' is further formed on the rear face side of a metal element 14. The width in the left-and-right direction of the second recess 20' is the same as the width in the left-and-right direction of the first recess 20, but since no inclined face 15b is formed on a rear face of a body part 15 of the metal element 14, the radially inner end of the second recess 20' reaches the radially inner end of the body part 15.

As explained for the first embodiment, due to the first recess 20 being formed on the front face side of the metal element 14, even when the metal element 14 on the front side and the metal element 14 on the rear side move relative to each other in the radial direction or in the rotational direction, it is possible to minimize the bending stress on the metal element 14, thereby minimizing degradation of the strength and degradation of the power transmission efficiency. As shown in FIG. 6 (A)-(D) and FIG. 7 (A)-(D), since the second recess 20' formed on the rear face side of the metal element 14 also exhibits the same function as the first recess 20 described above, the second embodiment, which has both the first recess 20 and the second recess 20', can achieve the same operational effects as in the first embodiment.

Third Embodiment

A third embodiment of the present invention is now explained by reference to FIG. 8 and FIG. 9.

As shown in FIG. 8 (A)-(C), a metal element 14 of the third embodiment includes a first recess 20 in a front face and a third recess 20" in a rear face. The first recess 20 is formed so as to extend from one part on the radially inner end side of a neck part 16 to a body part 15. Furthermore, the third recess 20" is formed so as to extend from one part on the radially outer end side of the neck part 16 to an ear part 17. The width in the left-and-right direction of the first recess 20 and the width in the left-and-right direction of the third recess 20" are identical and constant in the radial direction. The radially outer end of the first recess 20 is further radially inward than the radially inner end of the third recess 20", and the first recess 20 and the third recess 20" do not overlap one another when viewed in the fore-and-aft direction.

Therefore, a flat portion 16a that is one step higher than the first recess 20 is formed on a front face of the neck part 16, and a flat portion 16b that is one step higher than the third recess 20" is formed on a rear face of the neck part 16, the flat portions 16a and 16b overlapping one another when viewed in the fore-and-aft direction. The flat portion 16a on the front face of the neck part 16 is flush with flat portions 17c and 17c of the ear part 17 and a rocking edge 19, and the flat portion 16b on the rear face of the neck part 16 is flush with a part other than the third recess 20".

In accordance with the present embodiment, not only can the same effects as in the first embodiment be achieved by the first recess 20, but the following further effects can also be achieved. That is, as shown in FIGS. 9 (A) to (F), due to the flat portions 17c and 17c of the ear part 17 of the metal element 14 on the rear side abutting against a rear face of the ear part 17 of the metal element 14 on the front side and the flat portion 16a of neck part 16 of the metal element 14 on the rear side abutting against the flat portion 16b of the neck part 16 of the metal element 14 on the front side, it is possible to stabilize the attitude of the metal element 14, thereby minimizing degradation of the power transmission efficiency.

In addition, as shown in FIGS. 9 (E) and (F), when the metal element 14 on the rear side is displaced toward the radially outer side with respect to the metal element 14 on the front side and moves forward so that the rocking edge 19 of the metal element 14 on the rear side enters the ring slots 18 and 18 of the metal element 14 on the front side, since the flat portion 16a of the neck part 16 of the metal element 14 on the rear side cannot move forward due to interference with the flat portion 16a of the neck part 16 of the metal element 14 on the front side, the radially outer end of the metal element 14 attempts to fall rearward. However, since the metal element 14 on the rear side undergoes elastic deformation due to a pressing force from a metal element 14 further to the rear side, adjacent metal elements 14 and 14 can maintain a mutually parallel positional relationship.

Embodiments of the present invention are explained above, but the present invention may be modified in a variety of ways as long as the modifications do not depart from the spirit and scope thereof.

For example, in the embodiments the radially inner edge 20a of the first recess 20 reaches the inclined face 15b of the body part 15, but this is not always necessary, and a radially inner edge 20a of a first recess 20 may extend from a neck part 16 to part of a body part 15 while bridging a rocking edge 19.

Furthermore, in the embodiment the radially inner end of the second recess 20' reaches the radially inner end of the body part 15, but this is not always necessary, and the radially inner end of a second recess 20' may extend from a neck part 16 to part of a body part 15 while bridging a rocking edge 19.

The invention claimed is:

1. A metal belt for a continuously variable transmission, the metal belt, which is wound around a drive pulley and a driven pulley and transmits a driving force between the two pulleys, comprising a pair of metal ring assemblies that are arranged side by side in a left-and-right direction and a large number of metal elements that are latched to the pair of metal ring assemblies in a state in which the metal elements are stacked in a fore-and-aft direction, the metal element comprising a pair of ring slots with which the pair of metal ring assemblies engage, a neck part that is positioned between the pair of ring slots, a body part on which is formed a saddle face that is continuous with a radially inner side of the neck part and supports an inner peripheral face of the pair of metal ring assemblies, and an ear part that is continuous with a radially outer side of the neck part and opposes an outer peripheral face of the pair of metal ring assemblies, and a rocking edge being provided at a radially outer end of a front face of the body part, the rocking edge being a fulcrum for pitching of the metal element, wherein a first recess extending from the ear part to the body part is formed in front faces of the ear part, the neck part and the body part while extending entirely in a widthwise direction of the neck part, and wherein the front face of the body part on a radially inner side of the rocking edge is formed as an inclined face that is inclined toward a rear side in going toward the radially inner side, the inclined face being configured to push a rear end of the saddle face of an adjacent one of the metal elements on a front side when transmitting a driving force between the two pulleys.

2. The metal belt for a continuously variable transmission according to claim 1, wherein a second recess extending from the neck part to the body part is formed in rear faces of the neck part and the body part.

* * * * *